Patented Apr. 6, 1943

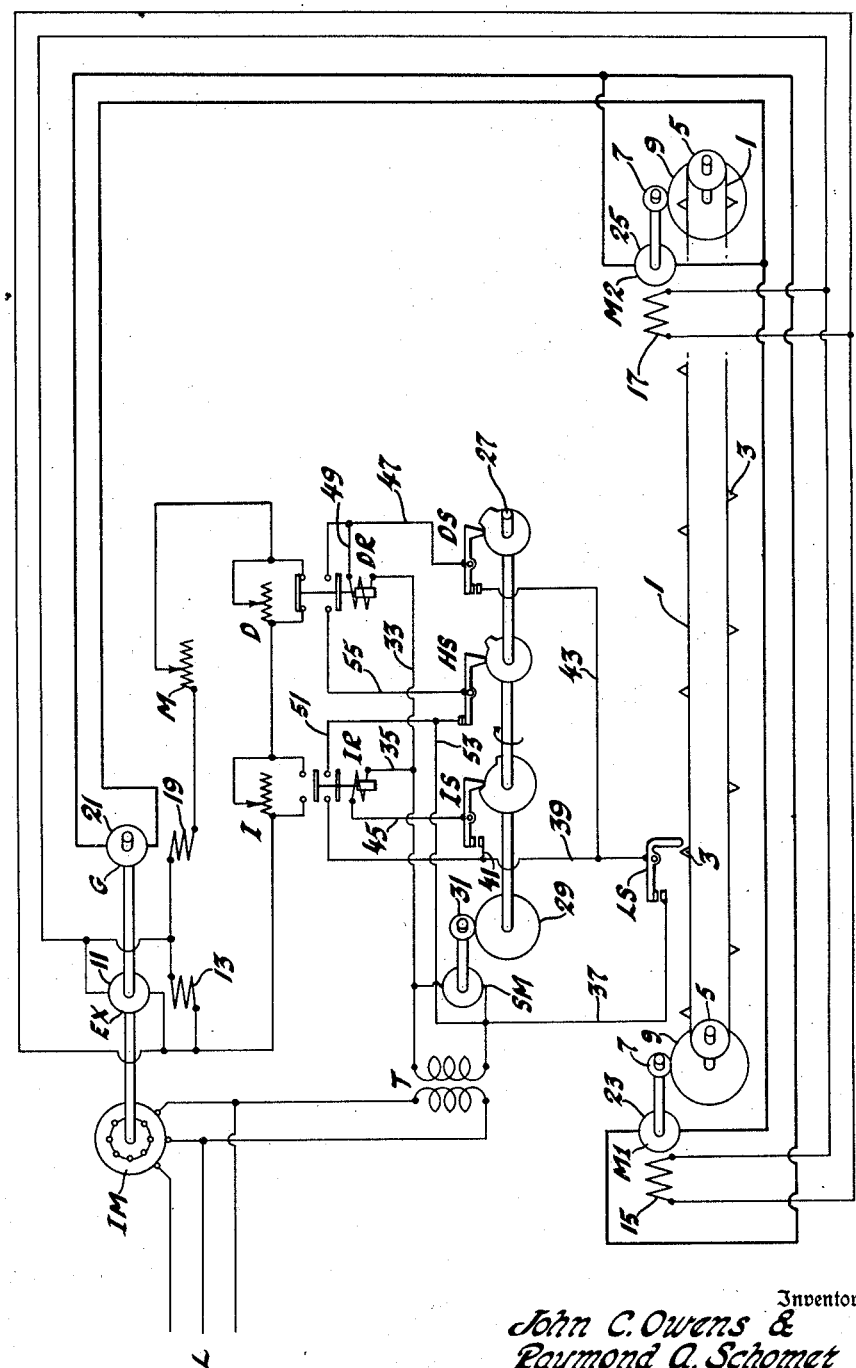

2,316,015

UNITED STATES PATENT OFFICE 2,316,015

CONVEYER CONTROL

John C. Owens, Grand Blanc, and Raymond A. Schomer, Flint, Mich., assignors to General Motors Corporation, Detroit, Mich., a corporation of Delaware Application August 23, 1941, Serial No. 408,062

6 Claims. (Cl. 198—203)

The present invention relates generally to speed regulating means and more particularly to a simple speed regulating means for conveyers which insures that a preselected number of objects supported in equally spaced relation on the conveyer will pass assembly stations in any preselected constant interval of time.

In manufacturing plants where long main conveyers are used for moving subassemblies and branch conveyers are used for moving parts it is necessary that the parts and subassemblies arrive at assembly stations simultaneously and at regular intervals so that the necessary assembly operations may be completed during the interval of movement of the subassemblies and parts past the assembly stations. On account of the length and weight of these conveyers and non-uniform loading thereon as assembly progresses, wear and slack develops in the conveyer, which causes hunting of the many driving motors required to operate the conveyers and at times causes damage to the conveyer and driving means therefor.

The principal object of the present invention is the provision of simple drive and control means for a conveyer which is controlled jointly by the conveyer and time controlled means operating in timed relation with the conveyer for frequently regulating the power supplied to the conveyer driving motors to maintain constant uniform linear movement of the conveyer.

The means by which the above object is accomplished, together with other features of the invention, will be better understood by referring to the following detailed description of the invention and the single drawing illustrating the invention in diagrammatic form.

Referring now to the drawing, an endless conveyer is shown at 1, which may be of the belt or chain type, and which has a number of dogs 3 fixed at equally spaced points thereon for locating objects to be conveyed from one position to another. The conveyer is supported on pulleys or sprockets, two of which are shown at 5, driven at any desired preselected speed by means of the gears 7 and 9 and direct current motors M1 and M2.

A motor generator exciter power source is provided for energizing the motors which comprises a direct current generator G, a direct current exciter EX and a three phase induction motor IM for driving the exciter and generator. The induction motor is shown connected to a commercial three phase power line L the frequency of which is accurately controlled by any well known time controlled means. The exciter EX furnishes excitation current for the generator G and motors M1 and M2. The armature 11 of the exciter is shown connected in parallel with the exciter excitation winding 13 and the excitation windings 15 and 17 of the motors M1 and M2 and also the excitation winding 19 of the generator G, suitable excitation varying means comprising the field rheostats I, M and D being shown connected in series with the generator field winding 19. The armature 21 of the generator is shown connected in parallel to the armatures 23 and 25 of the motors by power conductors shown in heavy lines on the drawing.

A control or regulating means is provided for the generator excitation varying means comprising relays IR and DR controlled jointly by a limit switch LS operated by the conveyer dogs 3 and time controlled switches IS, HS and DS to adjust the generator excitation current at frequent intervals in order to vary the power supplied to the conveyer driving motors and thereby maintain constant linear speed of the conveyer.

The relays IR and DR as shown include an actuating winding, a movable armature having contacts fixed thereon and two pairs of fixed contacts. The upper pair of fixed contacts of the relay IR are shown connected across the rheostat I and the lower pair of fixed contacts are holding contacts, to be referred to later. The contact arrangement of the relay IR, as shown, is such that the relay armature is attracted and moved upward from the normal position upon energization of the relay winding to cause both pairs of fixed contacts to be bridged by the armature contacts. As the upper pair of fixed contacts are shown connected across the rheostat I, when these contacts are bridged the rheostat is shunted to increase the generator excitation and therefore increase the power output to the motors M1 and M2 and the speed thereof. The rheostat I and relay IR, therefore, serve as driving motor speed increasing means. The upper pair of contacts of the relay DR are shown connected across the rheostat D, and the lower pair of fixed contacts are also holding contacts, to be referred to later. The contact arrangement of the relay DR, as shown, is such that the upper pair of fixed contacts are normally bridged and the lower pair or holding contacts are normally open. Upon energization of this relay winding the armature will be attracted and moved upward to open the upper pair of fixed contacts and bridge the holding contacts. When the upper pair of contacts are opened the rheostat D is inserted in the generator excitation circuit to decrease the generator excitation current and therefore decrease the power output to the motors M1 and M2 and the speed thereof. The rheostat D and relay DR, therefore, serve as driving motor speed decreasing means.

Each of the time controlled switches IS, HS and DS includes a cam disc fixed to a camshaft 27, a pivoted cam follower contact arm and a fixed contact contactable by the contact arm. The camshaft 27 is rotated at constant speed in the direction shown by the arrow through gears 29 and 31 by a synchronous driving motor shown at SM. The synchronous motor SM is shown connected across the secondary of a transformer T, the primary of which is connected to one phase of the power line L. As the frequency of the power line, as previously mentioned, is maintained constant by time controlled means, the speed of the synchronous motor and the cam switches driven thereby will be constant and therefore constitute time controlled switching means.

The gear ratio of the gears 29 and 31 is selected so that the camshaft 27 is rotated in timed relation with the conveyer in such manner that one revolution of the shaft corresponds to uniform linear movement of the conveyer equal to the distance between successive dogs 3 equally spaced on the conveyer 1. The cam discs are so formed and fixed on the camshaft 27 that, upon rotation of the camshaft through one revolution, the cyclic sequence of operation of the switches IS, HS and DS from the position in which they are shown is as follows: (1) switch IS closes; (2) switch IS opens; (3) switch HS opens; (4) switch DS closes; (5) switch HS closes; (6) switch DS opens; (7) switch HS opens. As will be subsequently explained, the switch IS controls energization of relay IR and therefore is part of the driving motor speed increasing means. The switches DS and HS serve jointly to control energization and de-energization of the relay DR and therefore are part of the driving motor speed decreasing means, the switch HS serving as a holding switch.

The limit switch LS is provided with a pivoted contact arm movable into contact with a fixed contact located adjacent thereto. The limit switch is located adjacent the conveyer and the control arm is formed as shown so that it will be struck and moved momentarily into contact with the fixed contact by each of the dogs 3 on the conveyer.

The control and holding circuit connections interconnecting the above described relay windings and switches, whereby the generator excitation is automatically adjusted at frequent intervals to maintain the speed of the conveyer constant, will now be described. The lower terminals of each of the relay actuating windings are shown connected by conductors 33 and 35 to the upper terminal of the secondary winding of the transformer T. The lower terminal of the transformer secondary winding is connected to the fixed contact of the limit switch LS by a conductor 37. The contact arm of the limit switch is connected by a conductor 39 to the left holding contact of the relay IR, and conductors 41 and 43 are connected, respectively, between the conductor 39 and the fixed contacts of the speed increasing and decreasing cam switches IS and DS. The contact arm of the switch IS is connected by a conductor 45 to the upper terminal of the winding of relay IR, and the contact arm of the switch DS is connected to the upper terminal of the winding of relay DR and also the right holding contact of this relay by conductors 47 and 49. The right holding contact of relay IR is connected by a conductor 51 to the fixed contact of the cam holding switch HS and a conductor 53 is connected between the conductor 51 and the lower terminal of the transformer secondary winding. The left holding contact of relay DR is connected by a conductor 55 to the contact arm of the holding switch HS.

The operation of the combined conveyer drive and control system is as follows: With the motor generator exciter power source in operation and the conveyer normally loaded, the rheostats M, I and D are adjusted to cause the conveyer 1 to be driven by the driving motors at the desired preselected value of speed. When the induction motor is energized from the power line L, the transformer T and the synchronous motor SM will likewise be energized and will operate at synchronous speed to drive the shaft 27 at constant speed in timed relation with the speed of the conveyer, as previously explained. With the cam switches IS, HS and DS in the positions shown, that is, with the switches IS and DS open and the holding switch HS closed, should the limit switch LS be momentarily closed by passage of one of the conveyer dogs 3, neither of the windings of the relays IR or DR will be energized as each of the switches IS and DS is open and is connected in series relation between the limit switch and each of the relay windings. The relay armatures will, accordingly, remain in the normal position as shown, with the rheostat D shunted out by the bridged upper fixed contacts of the relay DR, and the rheostat M and rheostat I will be connected in series relation with the generator excitation winding to limit the current therein such that the power supplied to the driving motors is of the proper value to maintain the speed of the conveyer at the correct preselected value.

Should the speed of the conveyer decrease slightly below the correct value between the passage of successive conveyer dogs 3 the limit switch will be momentarily closed late by one of the dogs 3, that is, after the cam switch IS is closed. With the switches IS and LS closed simultaneously the winding of the speed increasing relay IR will be connected across the transformer secondary winding and energized through the closed contacts of these switches and conductors 37, 39, 41, 45, 35 and 33. The armature of the relay IR will, accordingly, be attracted and moved upward and the contacts thereon will simultaneously bridge both pairs of fixed relay contacts. Bridging of the upper pair of relay contacts shunts out the rheostat I to increase the excitation current in the generator field winding 19 to increase the power output of the generator G to the conveyer driving motors M1 and M2 to increase the speed of these motors and the conveyer 1. Bridging of the holding contacts, that is, the lower fixed pair of contacts of the relay IR, establishes a holding circuit to the relay winding before opening of the limit switch LS through the bridged relay holding contacts and closed contacts of switch IS and conductors 53, 51, 39, 41, 45, 35 and 33 to maintain the relay winding energized and rheostat I shunted until the switch IS is again opened by rotation of its cam through an angle which, as shown, is less than 360°. This angle is determined by the length of the conveyer, the load thereon and operating and regulating characteristics of the generator G and motors M1 and M2 and the resistance of the rheostat I to obtain prompt adjustment of the speed of the driving motors.

Upon a slight increase in the speed of the conveyer above that of the preselected correct value the limit switch will be momentarily closed early, that is, upon closure of the speed decreasing cam switch DS. Simultaneous closure of the switches LS and DS causes the winding of the speed decreasing relay DR to be connected across the secondary of the transformer T and energized through the closed contacts of these switches and conductors 37, 43, 47, 49 and 33. The armature of the relay DR will, accordingly, be attracted and moved upward and the contacts thereon will bridge the relay holding contacts and open the upper pair of fixed contacts. Bridging of the holding contacts establishes a holding circuit to the relay winding before the limit switch opens through the bridged holding contacts of the relay and closed contacts of the holding switch HS and conductors 53, 51, 55, 47, 49 and 33. The holding switch HS closes slightly before the limit switch LS and the speed decreasing switch DS open, and remains closed until opened by rotation of its cam disc through an angle suitable to cause a prompt decrease in the speed of the driving motors and conveyer to the correct speed. The angle necessary to maintain the holding switch closed is also determined by the operating characteristics of the generator and motors and the length of the conveyer, load thereon and the resistance of the rheostat D.

With the above described generator excitation regulating means the speed increasing relay is initially energized by late momentary closure of the limit switch LS when the speed increasing switch IS is also closed, and this relay is maintained energized as long as the relay holding contacts are bridged and the speed increasing switch IS is closed, which is less than one revolution of the cam disc operating this switch. The resistance of the rheostat I may be adjusted so that during the interval it is shunted out of the generator excitation circuit by the relay IR the resulting increase in generator power output to the motors is sufficient to increase the speed of the motors M1 and M2 and conveyer 1 to the correct speed when the switch IS is opened.

Early momentary closure of the limit switch LS, that is, when both the speed decreasing switch DS and holding switch HS are closed causes the speed decreasing relay to be initially energized, and this relay is maintained energized as long as the holding contacts of this relay are bridged and the holding switch HS is closed, which is likewise less than one revolution of the cam disc operating this switch. The resistance of the rheostat D is adjusted so that during the interval it is inserted in the generator the reduction in the excitation current and the resulting decrease in the power output of the generator to the motors is sufficient to cause the speed of the motors M1 and M2 and conveyer 1 to be increased to the correct speed value when the holding switch HS is opened. The rheostat M in series with the rheostats I and D is adjusted initially to cause the conveyer to be driven at the proper value of speed selected.

Closure of the limit switch at times other than those described above, that is, when the conveyer is operating at the correct speed, causes no change in the generator excitation and output to the motors and therefore no correction in the speed thereof.

The above described conveyer drive and control system provides a frequent periodic adjustment of the power supplied to the conveyer driving motors at substantially constant time intervals when the conveyer speed varies slightly from a preselected constant value of speed. It will be evident that the speed of the conveyer may be changed to any preselected value by changing the gear ratio between the driving motors M1 and M2 and conveyer 1 and also by changing the ratio between the synchronous motor SM and the shaft 27 operating the cam operated switches retaining the same relation of timing between the conveyer 1 and camshaft 27 as described above.

The direct current power source and driving motors and adjustable rheostats allow slight adjustments to be made in the speed of the motors and give satisfactory and prompt speed and output regulation upon the insertion or shunting out of these rheostats by the relays, and the time controlled means, or switches driven by the synchronous motor, provide a constant reference speed for the speed of the conveyer and motors. The regulating means operated jointly by the conveyer dogs and time controlled means operates in a highly satisfactory manner without adjustment for long periods of time and effectively prevents hunting of the driving motors and damage to the conveyer and mechanical driving means therefor.

It will be evident that we have provided conveyer speed control means which is operated jointly by means operated at frequent and substantially constant time intervals by the conveyer and time controlled means operated at constant time intervals and in timed relation with the means operated by the conveyer so that any slight deviation in the speed of the conveyer with respect to the time controlled means will cause a prompt adjustment in the temporary speed of the conveyer such that it will run at an average value of speed equal to that of the time controlled means.

We claim:

1. A constant speed drive and control system comprising a conveyer having a multiplicity of equally spaced locating means fixed thereon for locating objects to be conveyed, motors for driving the conveyer, a source of power for the motors, output regulating means for said power source serving as speed regulating means for said motors, and control means for said output regulating means comprising a plurality of switches interconnected with said output regulating means, one of said switches being operable intermittently by said conveyer locating means and time controlled means for operating other of said switches at constant speed in timed sequence relation with said conveyer operated switch so that said output regulating means is controlled jointly by said switches at frequent intervals to maintain the speed of the conveyer constant.

2. In a constant speed drive and control system comprising a conveyer having a plurality of equally spaced locating means fixed thereto for positioning objects to be conveyed, a plurality of motors for driving the conveyer, a generator supplying power to the motors, generator excitation varying means to vary the generator output to the motors and therefore the speed thereof, and control means for said excitation varying means comprising relays for controlling the excitation varying means and switching means interconnected with the relays for controlling energization and deenergization of said relays, said switching means comprising a limit switch operated intermittently by said conveyer locating means and time controlled means for driving other switches in timed operating sequence relation with the conveyer to cause frequent intermittent operation of said relays only upon a slight deviation of the speed of the conveyer locating means with reference to the speed of the time controlled switches in order to cause frequent periodic correction in the speed of the conveyer.

3. In a constant speed drive and control system comprising a conveyer having locating means fixed thereon at equally spaced intervals to locate objects to be conveyed, motors for driving the conveyer, a source of power for said motors comprising a motor generator exciter set for supplying power and excitation current to both the generator and the motors driving the conveyer, generator excitation increasing and decreasing means for increasing or decreasing the power supplied to the driving motors by the generator to vary the speed of the motors thereof and control means for said generator excitation increasing and decreasing means comprising a plurality of switches interconnected with said excitation increasing and decreasing means, time controlled means comprising a synchronous motor for operating certain of said switches in timed sequence relation with the conveyer locating means and a switch operated momentarily by each of said locating means so that said excitation increasing or decreasing means is operated at frequent intervals to maintain the speed of the conveyer equal to the speed of the time controlled means.

4. In a constant speed drive and control system comprising a conveyer, a plurality of direct current motors for driving the conveyer, dogs fixed at equally spaced intervals on the conveyer, a source of power for the motors comprising a direct current generator, a direct current exciter and an alternating current motor connected to a constant frequency power source for driving the generator and exciter, power connections between the generator and motors, generator and motor excitation circuits connected to the exciter, rheostats in said generator excitation circuit, relays for inserting or shunting said rheostats to vary the excitation of the generator to vary the power output thereof to the driving motors in order to vary the speed of the driving motors, a constant frequency control circuit including a synchronous motor, switches operated in a definite cyclic sequence thereby and a limit switch operable momentarily by each conveyer dog for each cycle of operation of said first named switch to complete a connection through certain of said switches and relays upon slight differences in the speed of the conveyer with respect to the synchronous motor in order to control the relays and cause an increase or decrease in the speed of the driving motors at frequent intervals to prevent hunting of the motors and to cause the speed of the conveyer to be maintained constant.

5. A constant speed drive and control system comprising a conveyer, motors for driving the conveyer at substantially constant speed, a power source for the motors, output regulating means for the power source serving as speed regulating means for the motors, control means for the output regulating means comprising a plurality of switches, means equally spaced on the conveyer to operate one of said switches at frequent equally spaced time intervals determined by the speed of the conveyer and time controlled means for operating the other switches at constant time intervals in timed sequence relation with the switch operated by the means on the conveyer so that the output regulating means is controlled jointly by said switches to cause the average speed of the conveyer to be equal to that of the time controlled means.

6. A constant speed drive and control system comprising a traveling conveyer, motors for driving the conveyer at substantially constant speed, a power source connected to said motors, output regulating means for said power source to regulate the speed of the motors, control means for said regulating means comprising interconnected switches, one of said switches serving as a limit switch, means arranged on said conveyer and positioned to operate the limit switch at equally spaced intervals of conveyer travel, and time controlled means for operating the other switches in timed sequence relation with the means operating the limit switch so that the output regulating means is controlled at frequent intervals by the limit switch and switches interconnected therewith and driven by the time controlled means to cause the conveyer to be driven at constant speed.

JOHN C. OWENS.
RAYMOND A. SCHOMER.